April 5, 1949.  P. A. HILTZ  2,466,658
HYGROMETRIC DEVICE

Filed Jan. 25, 1946  2 Sheets-Sheet 1

INVENTOR.
Paul A. Hiltz
BY
Kenway & Witter
Attys.

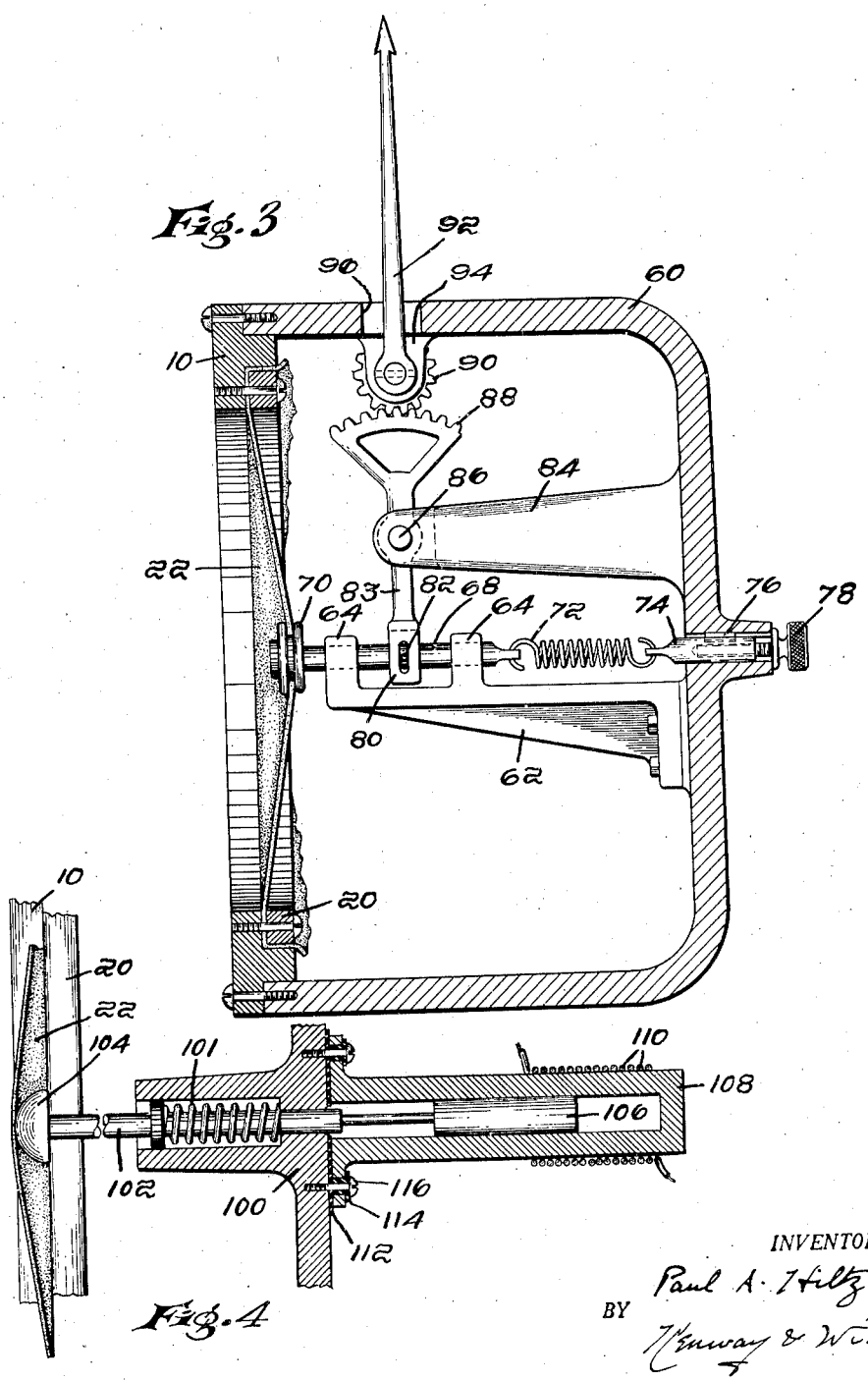

Patented Apr. 5, 1949

2,466,658

UNITED STATES PATENT OFFICE 2,466,658

HYGROMETRIC DEVICE

Paul A. Hiltz, Somerville, Mass., assignor to Serdex, Inc., Boston, Mass., a corporation of Massachusetts Application January 25, 1946, Serial No. 643,430

4 Claims. (Cl. 73—337)

My invention relates to hygrometry and consists in a hygroscopic unit of improved sensitivity, power, and repeatability.

Hitherto it has been customary to employ a bundle of hairs or an elongated strip of animal tissue for the hygroscopic element in a hygrometric instrument. However, instruments heretofore available have been notoriously inaccurate and unsatisfactory. The principal difficulty encountered has been the lag, or hysteresis, which introduces an error of about 15%. That is to say, when the humidity increases or decreases substantially and then returns to its original value, the reading will be found erroneous by that amount. Furthermore in order to gain power sufficient to actuate recording apparatus the bundle of hairs or strip of tissue has had to be widened with considerable sacrifice in sensitivity.

The primary object of my invention is to improve the accuracy and power of hygrometric instruments and particularly to eliminate erroneous reading due to the effect of hysteresis.

Another object of my invention is to provide improved hygrometric apparatus for radiosonde recorders, recording hygrographs, hygroscopes, hygrometers, and various types of telemetering instruments requiring the use of humidity data.

The most important feature of my invention resides in a diaphragm of goldbeater's skin tightly stretched over a ring in combination with an indicator bearing on the diaphragm and movable in response to changes in the tautness of the diaphragm caused by variations in the atmospheric humidity to which it is exposed.

Figure 1:
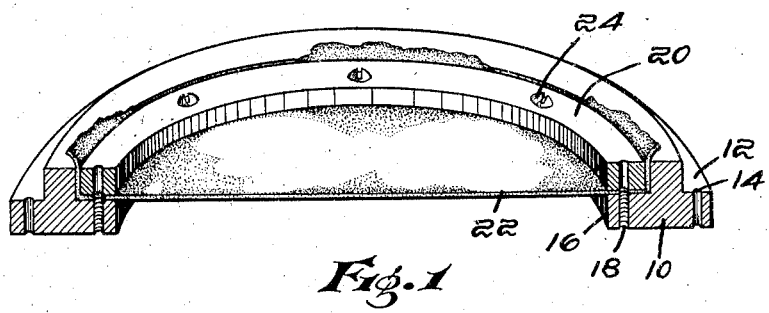
Figure 2:
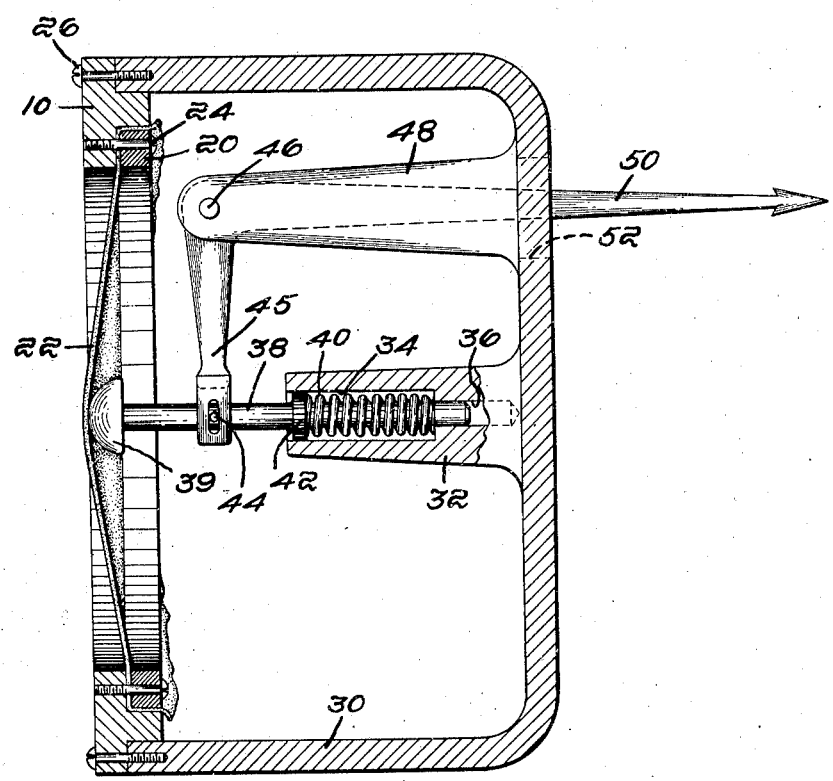

These and other objects and features of my invention will be more readily understood and appreciated from the following detailed description of a preferred embodiment thereof selected for purposes of illustration and shown in the accompanying drawings, in which Fig. 1 is a view partly in perspective and partly in cross-section of a diaphragm constructed in accordance with the invention, Fig. 2 is a view in vertical cross-section through an instrument embodying the invention, Fig. 3 is a view in cross-section through a second embodiment of the invention, and Fig. 4 is a view in cross-section through a portion of a third embodiment of the invention.

For the hygroscopic material I use goldbeater's skin, i. e. the membrane of the large intestine of the ox. To support the membrane I provide an outer ring 10 of brass or other metal having a peripheral flange 12 of reduced thickness provided with a series of screw holes 14, and an inner peripheral flange 16 of reduced thickness provided with a series of threaded holes 18. An inner metal ring 20 fits snugly on the flange 16. I stretch over the outer ring 10 a sheet 22 of goldbeater's skin and press the inner ring 20 into position on the flange 16. Subsequently I screw the rings together with a series of screw 24 which are received in the threaded holes 18. Thus, there is formed a circular diaphragm 22 of goldbeater's skin maintained under radial tension and confined throughout its margin. The excess protruding between the rings is trimmed off flush with the tops of the rings 10 and 20. The degree of radial tension imposed on the diaphragm is determined in advance by the amount of tension exerted on the goldbeater's skin before the rings are pressed together. It is important to note that the edge of the diaphragm is confined throughout and that there is no portion thereof which is free to move.

There is an infinite variety of ways in which the hygroscopic element thus produced may be employed in practice. I have suggested three possible instruments in Figs. 2–4.

In Fig. 2 there is provided a cylindrical metal case 30 having one open end to which the hygroscopic unit is secured by means of a series of screws 26 which pass through the holes 14 in the outer flange of the ring 10. Disposed in the center of a closed end of the case 30 is a boss 32 containing a large axial socket 34 and a smaller coaxial socket 36. A rod or finger 38 extends into both sockets and has on its outer end a rounded button 39 bearing against the center of the diaphragm 22. Within the socket 34 and surrounding a portion of the finger 38 is a compression spring 40 which bears against the bottom of the socket 34 and a stop 42 formed on the rod 38.

At an intermediate point the rod 38 is provided with a transverse pin 44 received on either side in a slot formed in the forks of a clevis at one end of an arm 45. The upper end of the arm 45 is mounted on a pivot pin 46 secured in a hollow boss 48 extending into the case 30 and containing an arm or pointer 50 secured to or integral with the arm 45.

In operation the pointer 50 swings in accordance with changes in the tension or tautness of the diaphragm 22. That is to say, if the humidity decreases the tension of the diaphragm increases, since the goldbeater's skin shrinks as it dries.

In Fig. 3 I have shown another embodiment of the invention. Here again a diaphragm 22 is confined by a pair of rings 10 and a 20 and secured to a cylindrical case 60. A bracket 62 secured to the wall of the case 60 provides a pair of bearings 64 in which slides a rod 68 secured at one end to a grommet 70 set in the center of the diaphragm 22. The other end of the rod 68 is pierced to receive one end of a tension spring 72. The outer end of the spring 72 is hooked into the end of a plunger 74 received in a socket in the case 60 and slotted to fit a key 76 which prevents rotation of the plunger. A set screw 78 is threaded into the end of the plunger 74 and bears against the case 60 to provide means for adjusting the tension of the spring 72.

A pin 82 is set into the rod 68 at an intermediate point and works in slots formed in a clevis 80 on the end of an arm 83. A bracket 84 is mounted in the case 60 and carries at its inner end a pivot pin 86 on which the arm 83 is mounted. The upper end of the arm 83 terminates in a gear segment 88 meshing with a pinion 90 keyed to a pointer 92 pivotally mounted on a lug 94 and extending from the case 60 through a slot 96 which incidentally equalizes atmospheric pressure at all times within and without the case 60.

The operation of the device shown in Fig. 3 is analogous to that shown in Fig. 2. However the grommet 70 provides a more positive connection between the diaphragm 22 and the mechanical linkage. As the diaphragm contracts or extends in response to changes in humidity the rod 68 is moved axially against the spring 72. The movement of the rod 68 is transmitted through the arm 83 and the gearing to the pointer 92. It is to be understood that the pointer 92 in Fig. 3 as well as the pointer 50 in Fig. 2 may be connected to any suitable recording apparatus or be arranged to play across the face of a suitably calibrated dial.

In Fig. 4 I have suggested a construction in which the diaphragm is coupled with an electric recording or indicating circuit. In this case the diaphragm 22 of goldbeater's skin is again confined between a pair of rings 10 and 20. A case 100 is provided with an integral socket receiving a spring 101 which surrounds a portion of a rod or finger 102 provided at its inner end with a rounded button 104 bearing against the diaphragm 22. The rod extends through the wall of the case 100 and terminates in a reduced portion carrying an iron cylinder 106 received in an axial bore formed in a coil support 108 of dielectric material. A coil 110 of insulated wire is wrapped about the exterior of the support 108 and forms part of an electrical indicating or recording circuit of conventional design. A gasket 112 of insulating material is interposed between the coil support 108 and the case 100, and the support is secured to the case by means of a series of screws 116 received in insulating bushings 114. The bushings 114 and the gasket 112 effectively insulate the support 108 from the case 100. The cylinder 106 thus forms the movable core for the coil 110, and the axial movement of the core 106 in response to the change in tension on the diaphragm 22 varies the inductance of the coil 110. The variations in inductance of the coil 110 are used to actuate recording or indicating instrumentalities coupled to the circuit. While I have shown structure for varying inductance of a coil included in the circuit, it will be understood that the rod 102 may also be connected to means for varying capacitance, resistance, or other impedance in any number of suitable circuits. Inasmuch as the type of circuit used depends upon the location of the apparatus, the type of power available, and the use to which the apparatus is to be put, I have not shown the details of any one circuit.

Apparatus of the type herein illustrated and described offers several advantages over hygroscopic elements heretofore in use. In the first place the fact that the entire periphery of the diaphragm is confined and the entire diaphragm subjected to equal tension, results in greatly increased sensitivity as well as greater extension. Furthermore the construction herein shown prevents errors due to hysteresis, particularly by eliminating the undesirable effects which occur when shrinkage takes place and portions of the edge are free to move. A strip of goldbeater's skin of $\frac{3}{16}$ of an inch wide and confined only at its ends will exhibit an error of at least 15% plus or minus. By using a 2½" or 1½" diameter diaphragm of the type herein shown, the error in calibration is reduced to less than 2% plus or minus. As regards the power available, I have found that a 2½" diameter diaphragm expands $\frac{9}{64}$ of an inch and a 1½" diaphragm expands more than $\frac{9}{64}$ of an inch for a given degree of change in humidity. This may be contrasted with the extension obtained from a strip of goldbeater's skin $\frac{3}{16}$ of an inch wide and 3" long. In the latter case the maximum extension is only $\frac{4}{64}$ of an inch. Thus it will be seen that the diaphragm of my invention not only increases the accuracy and sensitivity of hygrometric devices but materially increases the mechanical power available for the actuation of measuring or indicating devices.

Having now described and illustrated several preferred embodiments of my invention what I claim as new and desire to secure by Letters Patent of the United States is:

1. A hygrometric instrument which comprises a circular diaphragm of hygroscopic goldbeater's skin, means including a casing for holding the entire diaphragm under radial tension while exposed on both faces to atmospheric conditions, and means acting on the diaphragm within the casing for indicating changes of tension therein caused by variations in atmospheric humidity.

2. A hygrometer comprising a pair of flat rigid annuli, a diaphragm of goldbeater's skin clamped marginally between said annuli, a spring loaded mechanism coupled to the center of the diaphragm and subjecting the diaphragm to predetermined radial tension and indicating means connected to and actuated by said diaphragm.

3. In a hygrometer including an indicator and mechanism for moving the indicator, a hygrometric element comprising a diaphragm of goldbeater's skin, an open frame confining the entire periphery of said diaphragm and exposing both faces thereof to the atmosphere, and means mechanically coupling said diaphragm to the mechanism and for tensioning said diaphragm.

4. In a hygrometer including a movable member, a hygrometric element comprising a diaphragm of goldbeater's skin, a frame confining the entire periphery of the diaphragm but exposing both surfaces thereof to the atmosphere, and means for tensioning said diaphragm and coupling it mechanically to the movable member.

PAUL A. HILTZ.

REFERENCES CITED

The following references are of record in the file of this patent:

UNITED STATES PATENTS

| Number | Name | Date |
|---|---|---|
| 127,752 | Emery | June 11, 1872 |
| 248,183 | Klinkerfues | Oct. 11, 1881 |
| 674,575 | Duwelius | May 21, 1901 |
| 899,488 | Hemberger | Sept. 22, 1908 |
| 985,496 | Ballard | Feb. 28, 1911 |
| 1,182,078 | Elfering | May 9, 1916 |
| 1,926,730 | Miller | Sept. 12, 1933 |
| 1,958,812 | Bristol | May 15, 1934 |
| 2,070,743 | McDonnell | Feb. 16, 1937 |
| 2,071,904 | Shurtleff | Feb. 23, 1937 |

FOREIGN PATENTS

| Number | Country | Date |
|---|---|---|
| 280,821 | Great Britain | Nov. 24, 1927 |
| 559,149 | Great Britain | Feb. 7, 1944 |